April 12, 1955
A. L. CRESCI
2,706,102
LIFTING MECHANISM FOR TRUCK BODY
Filed June 6, 1951
2 Sheets-Sheet 1
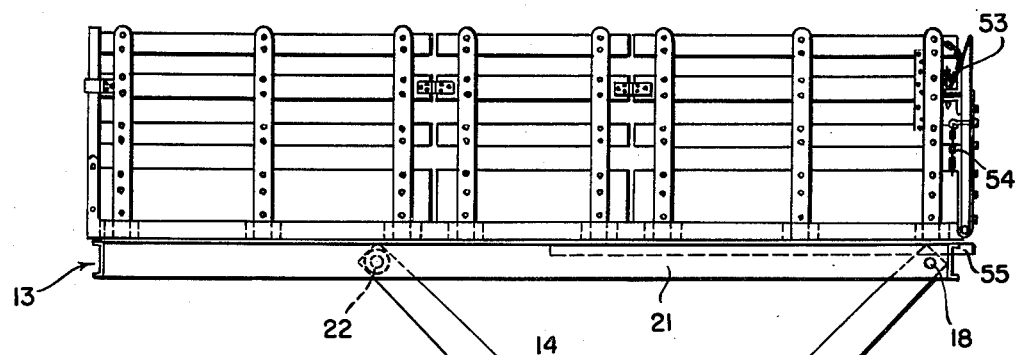
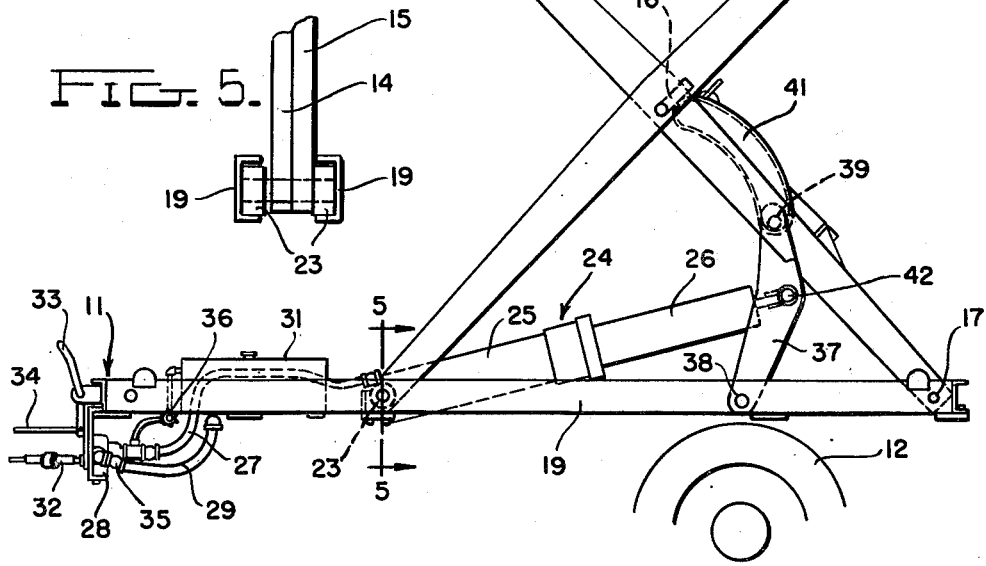
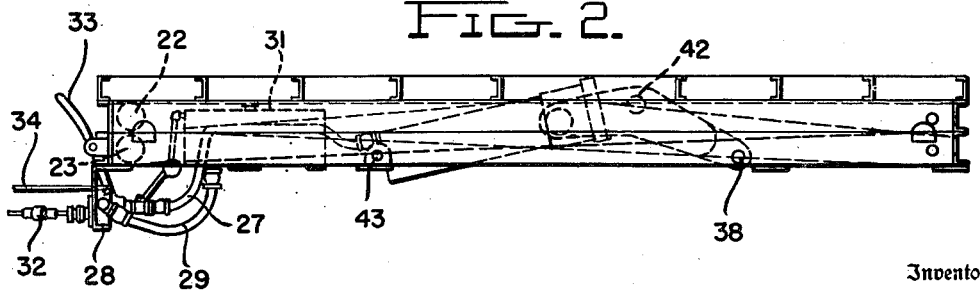
Inventor
ANTHONY L. CRESCI
By Whittemore, Hulbert & Belknap
Attorneys April 12, 1955
A. L. CRESCI
2,706,102
LIFTING MECHANISM FOR TRUCK BODY
Filed June 6, 1951
2 Sheets-Sheet 2
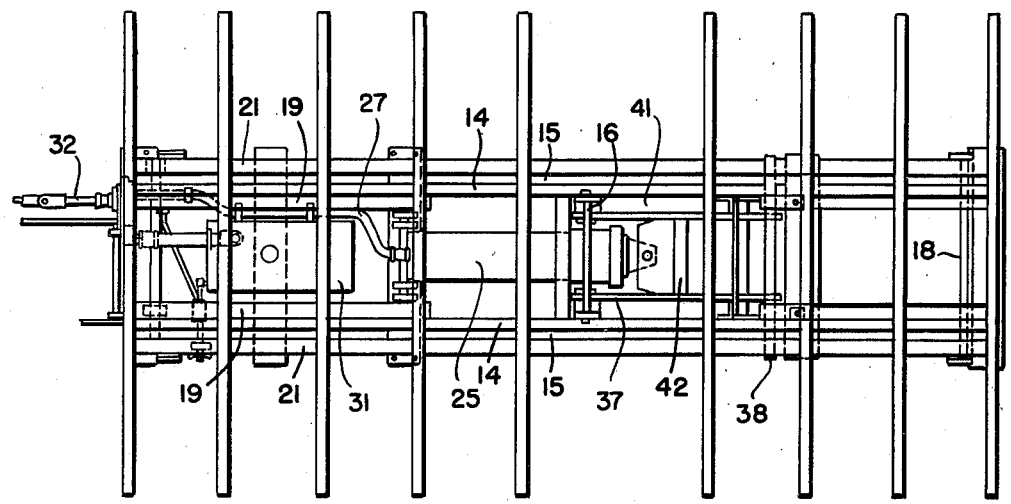
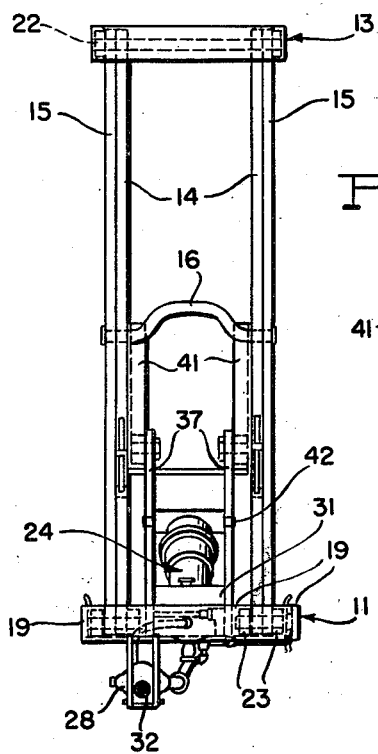
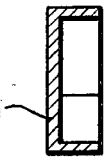
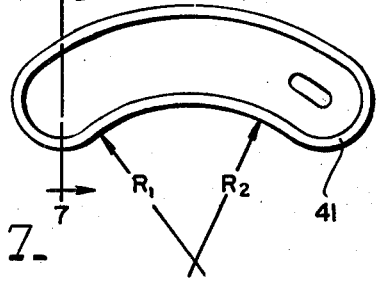
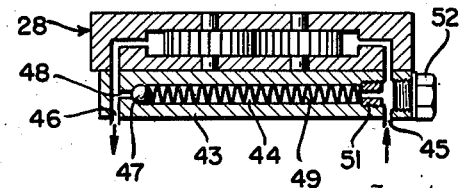
Inventor
ANTHONY L. CRESCI
By Whittemore, Hulbert & Belknap
Attorneys

United States Patent Office 2,706,102
Patented Apr. 12, 1955

2,706,102

LIFTING MECHANISM FOR TRUCK BODY

Anthony L. Cresci, Vineland, N. J.

Application June 6, 1951, Serial No. 230,151

9 Claims. (Cl. 254—8)

The present invention relates to lifting mechanism for elevating the body of a truck with respect to the chassis of the truck, and particularly to an arrangement of levers and hydraulic lift means designed for readily raising the body a substantial distance while maintaining it in parallel relation to the chassis.

The elevating mechanism comprises a hydraulic ram operatively connected to crossed lever arms adapted to have a scissors-like movement, the arms being suitably connected to the chassis and the body to lift the body in such a manner that it remains parallel to the chassis at all times during the elevation and descent of the body. The body when elevated may be brought into alignment with doors or openings in buildings, aircraft or loading and unloading platforms, and is particularly adapted to the transfer of cargo at a height considerably above the ground. At the same time, when the body is lowered to rest directly on the chassis, the overall height of the truck is no greater than that of conventional load carrying vehicles.

One of the objects of the invention is to provide crossed arms pivoted to each other intermediate their ends and adapted, when their angular relation is changed, to increase or decrease the distance between the ends of the respective arms for elevating or lowering a vehicle body.

Another object of the invention is to provide hydraulic power mechanism for changing the angular relation of the crossed arms.

A further object is to improve the leverage by employing a cam and roller connection between the hydraulic power means and the arms.

Other objects will be apparent from the following description of the invention taken with the accompanying drawings, in which Fig. 1 is a side elevation of that portion of a trailer truck showing the body in elevated position along with the hydraulic lifting mechanism for elevating the body.

Fig. 2 is a side elevation of the parts shown in Fig. 1, but with the lifting arms collapsed and the body resting on the chassis;

Fig. 3 is a top plan view of the body and lifting mechanism, the floor of the body being broken away to permit better illustration of the lifting mechanism;

Fig. 4 is a front elevation of the raised lifting mechanism shown in Fig. 1, parts of the body being omitted;

Fig. 5 is an enlarged fragmentary section taken on line 5—5 of Fig. 1.

Fig. 6 is an enlarged elevation of a cam track forming part of the lifting apparatus;

Fig. 7 is a section taken on line 7—7 of Fig. 6; and

Fig. 8 is a partial sectional view of the oil pump showing a relief valve therefor.

In the drawings, the trailer truck includes the usual chassis frame 11 supported on wheels 12 and separate body frame 13. The body is not directly secured to the chassis but is connected thereto by two pairs of crossed arms 14, 15, the pairs of arms being similar and pivoted to each other on a bowed cross shaft 16. Arms 14 are pivotally connected at one end to the chassis at 17, arms 15 being pivotally connected at one end to the body at 18. Secured to the chassis at each side thereof is a pair of parallel longitudinal tracks 19. A single pair of similar tracks 21 is secured to the body. Each track is channel-shaped, the open side of the channels on the body facing inwardly toward the longitudinal center of the truck. The channels of each pair of tracks on the chassis face each other, as shown in Fig. 5, thus providing a guide for the rollers which prevents them from being accidentally displaced from the tracks. The other end of each of arms 14 carries a single roller 22 disposed within the track channels 21. The other end of each of arms 15 carries on opposite sides thereof rollers 23 which ride in track channels 19. Thus it will be observed that one end of each of the lift arms is pivotally fixed at the rear end of the truck, the other ends being slidable in the tracks 19 and 21. The lengths of the arms are such that when their angular relation is changed, as by raising the body, the parallel relation of the chassis and body is maintained.

The mechanism for raising the body comprises a hydraulic ram together with swinging arms each having thereon a roller, each roller being disposed in a cam track on each of two of the lift arms. The ram, indicated at 24, includes the usual cylinder 25 and piston 26, the cylinder being pivotally secured to the chassis. Fluid, such as oil, is supplied under pressure to the ram cylinder through conduit 27 by a pump 28 taking oil from reservoir 31 through conduit 29. The pump is driven by a power take-off shaft 32, suitable clutch mechanism (not shown) being interposed between the pump and engine. The clutch is controlled by lever 33, a rod 34 extending therefrom to the clutch. A suitable check valve 35 is placed in conduit 29 and a manually operated valve 36 controls the return line from the ram to the reservoir.

The ram piston 26 is pivotally connected to rocker arms 37, the latter being pivoted at one end to the chassis frame at 38, each rocker arm carrying at its other end a roller 39. Each of the lift arms 14 has secured thereto, as by welding, an enclosed cam track 41 accommodating roller 39. It is to be noted that the cam track, as illustrated in Fig. 6, is curved on two radii, designated $R_1$, $R_2$ the radius $R_1$ of the track adjacent the pivotal connection of the cross arms being less than the radius $R_2$, that is, of the remaining portion of the track. The cam track may, if desired, be drawn on more than two radii, and, in some cases, be parabolic or hyperbolic. In any case, the curvature of the track decreases toward the pivotal connection of the cross arms. The centers of the curved portions of the cam track are disposed forwardly between the lower ends of the crossed arms. It will also be seen that the pivotal connection 42 between the ram piston 26 and rocker arm 37 is disposed above the fulcrum 38 at all times, the connection 42 never being lowered sufficiently to pass a dead center defined by a line drawn between the pivotal points 43 and 38. Thus, during its power stroke the ram piston exerts at all times a force to rock the arm 37 in a direction to lift lever 14 through cam track 41. The leverage is varied from the initial lowermost position of the arm 14, where the roller 39 engages the cam track at its extreme distance from fulcrum 17, to the position shown in Fig. 1 where the roller is at the other end of the cam track. Furthermore, since the cam is closed at its ends, the rocking movement of arm 37 is limited thereby. Because of the different radii of curvature of the cam track, the initial upward movement and final descent of the body is less rapid than at other stages of the lifting and lowering operations. Particularly when descending, the body is more gradually brought to rest. The arrangement of the ram, rocker lever, and cam track minimizes the length of the ram stroke and pivotal movement of the ram cylinder and thus obviates the necessity for locating the fulcrum of the ram below the chassis frame.

The oil supply pump illustrated in Fig. 8 is provided with pressure relief and by-pass means to prevent excess pressure in the hydraulic power mechanism due to overloading or when the elevating apparatus has reached its extreme upward movement. Attached to one side of the pump housing and communicating with the inlet and outlet openings thereof is a casing 43 having a passage 44 therethrough, the ends of the passage communicating respectively with the inlet 45 and outlet 46 of the pump. Within the passage adjacent the outlet is a ball valve 47 urged against seat 48 by spring 49. An adjusting screw 51 is employed to impose a predetermined initial compression on the spring, access thereto being had by removal of cap nut 52 which closes one end of passage 44. Should pressure greater than that necessary for normal operation of the ram be imposed on the ball valve, either because of overloading or when the rollers 39 engage the closed end of cam tracks 41, the spring pressure will be overcome and the ball valve opened to by-pass oil from the outlet side of the pump through passage 44 to the inlet of the pump.

For ordinary loading and unloading operations the tail gate 53 is lowered and supported by chains 54. Where the body may not be positioned closely enough to the platform or vehicle for the tail gate to bridge the distance therebetween, there is provided an extension plate 55 slidably supported beneath the body and adapted to form a bridge when extended.

While a preferred embodiment of the invention has been shown and described, it is intended that such modifications as fall within the definition of the invention as expressed in the claims to be included in the invention.

Having described my invention, what I claim as new and desire to secure by Letters Patent is:

1. A load carrying vehicle comprising a chassis, a body, body elevating mechanism comprising a pair of arms pivoted to each other intermediate the ends of said arms, each of said arms comprising a rigid one-piece member, one end of one of said arms having a pivotal connection with said chassis, one end of the other of said arms having a pivotal connection with said body, said connections being in vertical alignment, said chassis and said body each having a track secured thereto, a roller mounted at the other end of said one arm engaging the track on said body, a roller mounted at the other end of said other arm engaging the track on said chassis, a cam track secured to one of said arms, a rocker arm pivoted at one end to said chassis, a roller at the other end of said rocker arm engaging said cam track throughout the entire elevation of said arms, and power means connected to said rocker arm and adapted to swing said rocker arm and said first mentioned arms about their pivotal connections to the body and chassis.

2. A vehicle as claimed in claim 1 in which said cam track is arcuate and the power means includes a hydraulic ram connected to the rocker arm intermediate the ends of the rocker arm.

3. A vehicle as claimed in claim 2 in which the arcuate cam track is drawn on radii of different lengths.

4. A load carrying vehicle comprising a chassis, a body, body elevating mechanism including an element pivoted at one end to said chassis and connected to said body, an arcuate cam track rigidly secured to said element, a hydraulic ram pivoted at one end to said chassis, the pivotal connections of said element and said ram with said chassis being spaced longitudinally of the chassis, and a roller engaging said cam track, said ram having means moving said roller away from the pivotal connection of the ram with said chassis, at least a portion of said arcuate cam track being drawn about a center disposed between said cam track and the pivotal connection of the ram with said chassis.

5. A vehicle as claimed in claim 4 in which the arcuate cam track is drawn on radii of different lengths.

6. A vehicle as claimed in claim 4 in which the radius of that portion of the cam track engaged by the rocker arm roller at the initial stage of body elevation is less than that of the portion of the cam track engaged by the rocker arm roller at the final stage of body elevation.

7. A vehicle as claimed in claim 4 in which the cam track is channel-shaped in horizontal cross-section, the channel being closed at each end of the cam track.

8. A vehicle as claimed in claim 4 in which the radius of that portion of the cam track engaged by the rocker arm roller at the initial stage of body elevation is less than that of the portion of the cam track engaged by the rocker arm roller at the final stage of body elevation and in which the cam track is channel-shaped in horizontal cross section, the channel being closed at each end of the cam track.

9. A vehicle as claimed in claim 8 which said hydraulic ram is provided with a pressure responsive valve for interrupting the supply of fluid thereto when said roller engages a closed end of said cam track.

References Cited in the file of this patent

UNITED STATES PATENTS

| | | |
|---|---|---|
| 1,819,168 | Heil et al. | Aug. 18, 1931 |
| 2,401,370 | Payne | June 4, 1946 |
| 2,471,901 | Ross | May 31, 1949 |
| 2,480,916 | Gibson | Sept. 6, 1949 |
| 2,525,899 | Gustafson | Oct. 17, 1950 |
| 2,533,980 | Weaver | Dec. 12, 1950 |
| 2,578,264 | Raymick | Dec. 11, 1951 |

FOREIGN PATENTS

| | | |
|---|---|---|
| 231,745 | Great Britain | Apr. 9, 1925 |
| 659,435 | France | Feb. 4, 1929 |